J. HALTERBECK.
WOODWORKING MACHINE.
APPLICATION FILED AUG. 22, 1912. RENEWED DEC. 15, 1916.
1,234,016.
Patented July 17, 1917.
8 SHEETS—SHEET 7.
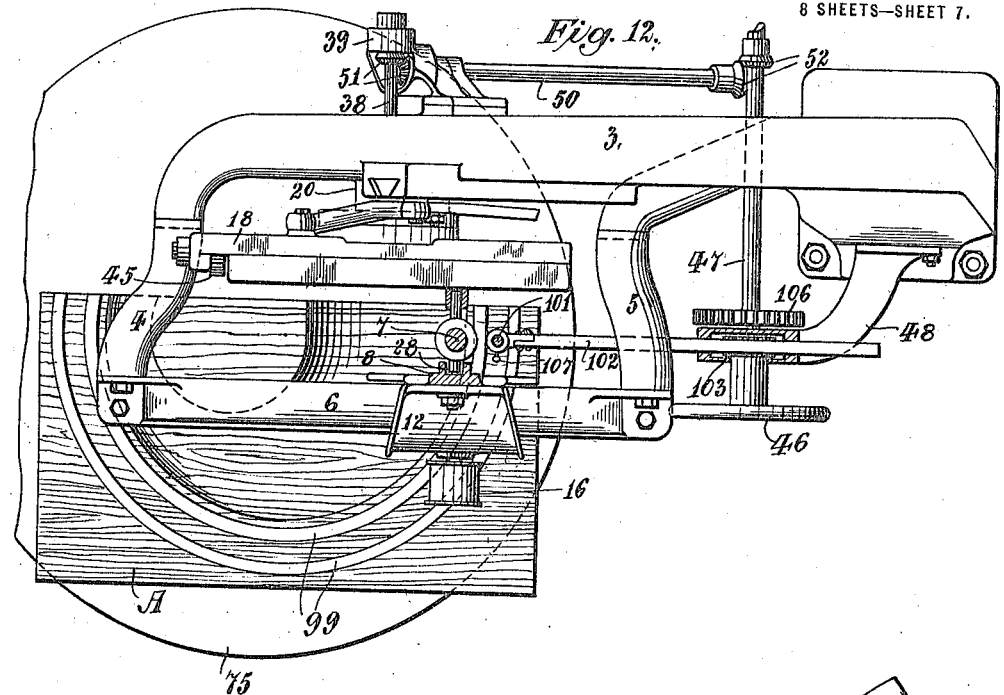
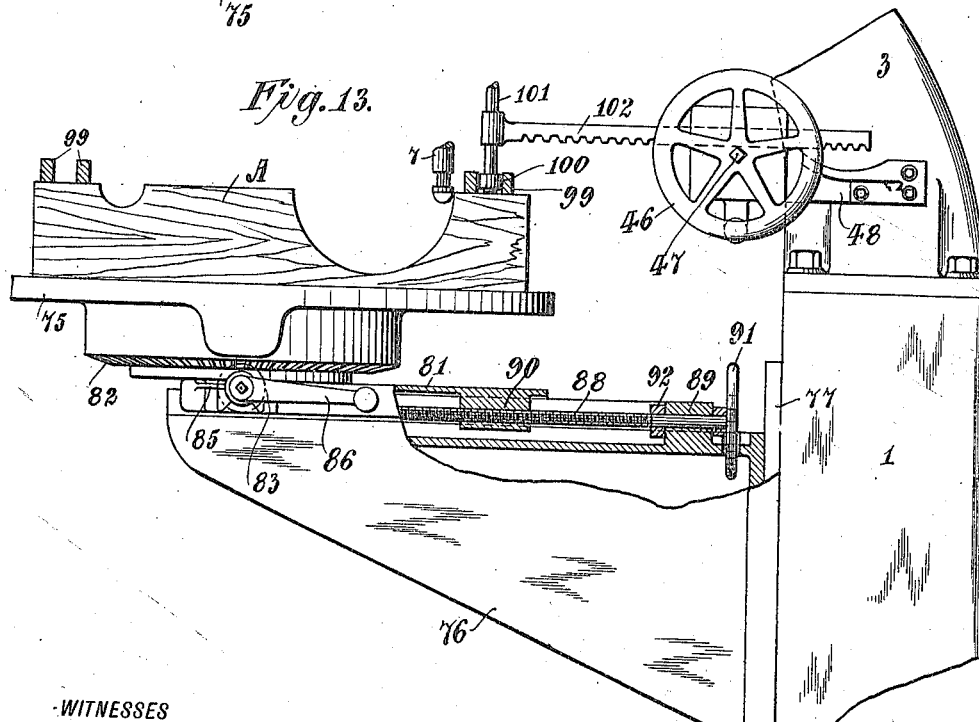
WITNESSES
INVENTOR
John Halterbeck
BY
Messimer & Austin
ATTORNEYS J. HALTERBECK.
WOODWORKING MACHINE.
APPLICATION FILED AUG. 22, 1912. RENEWED DEC. 15, 1916.

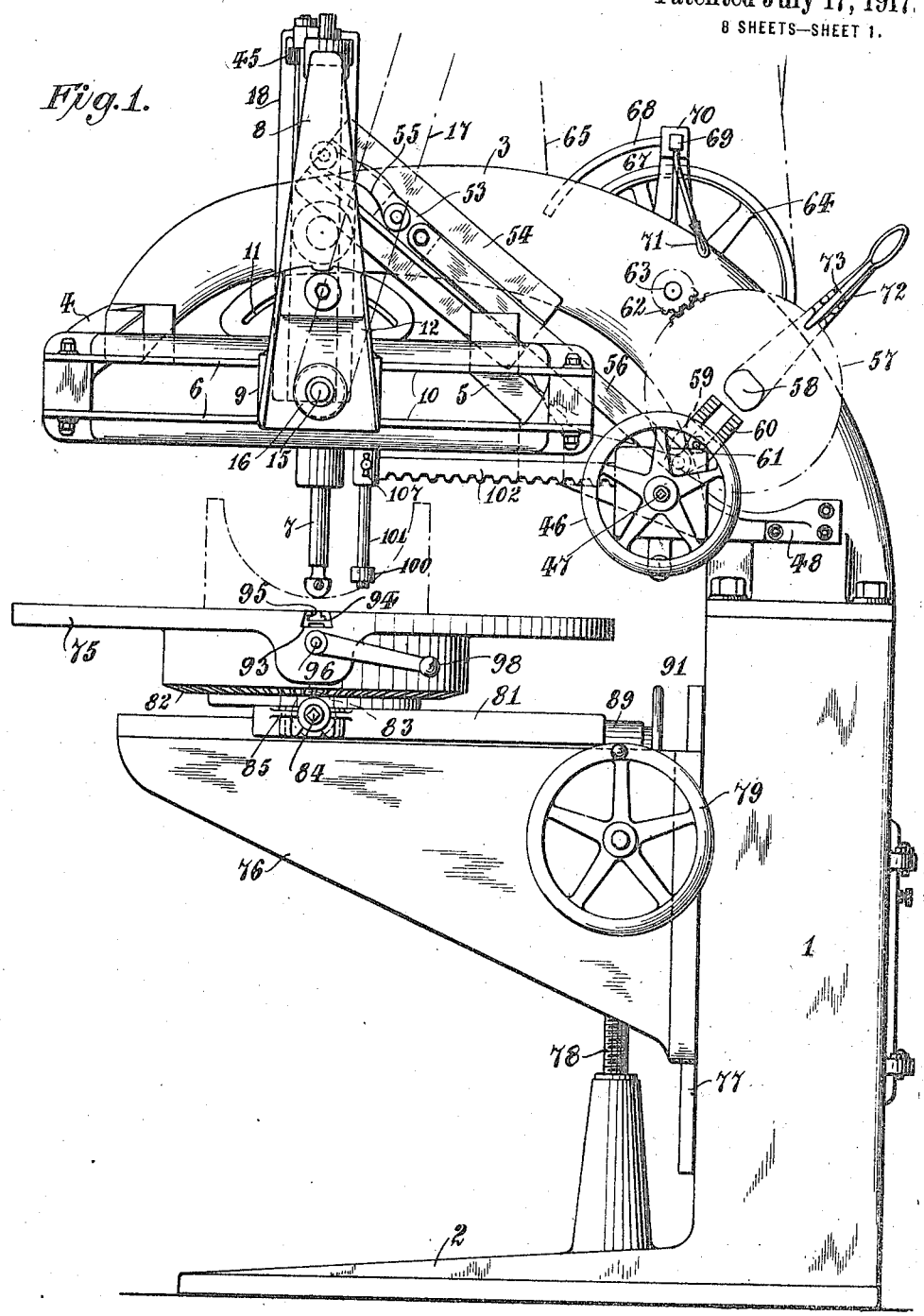

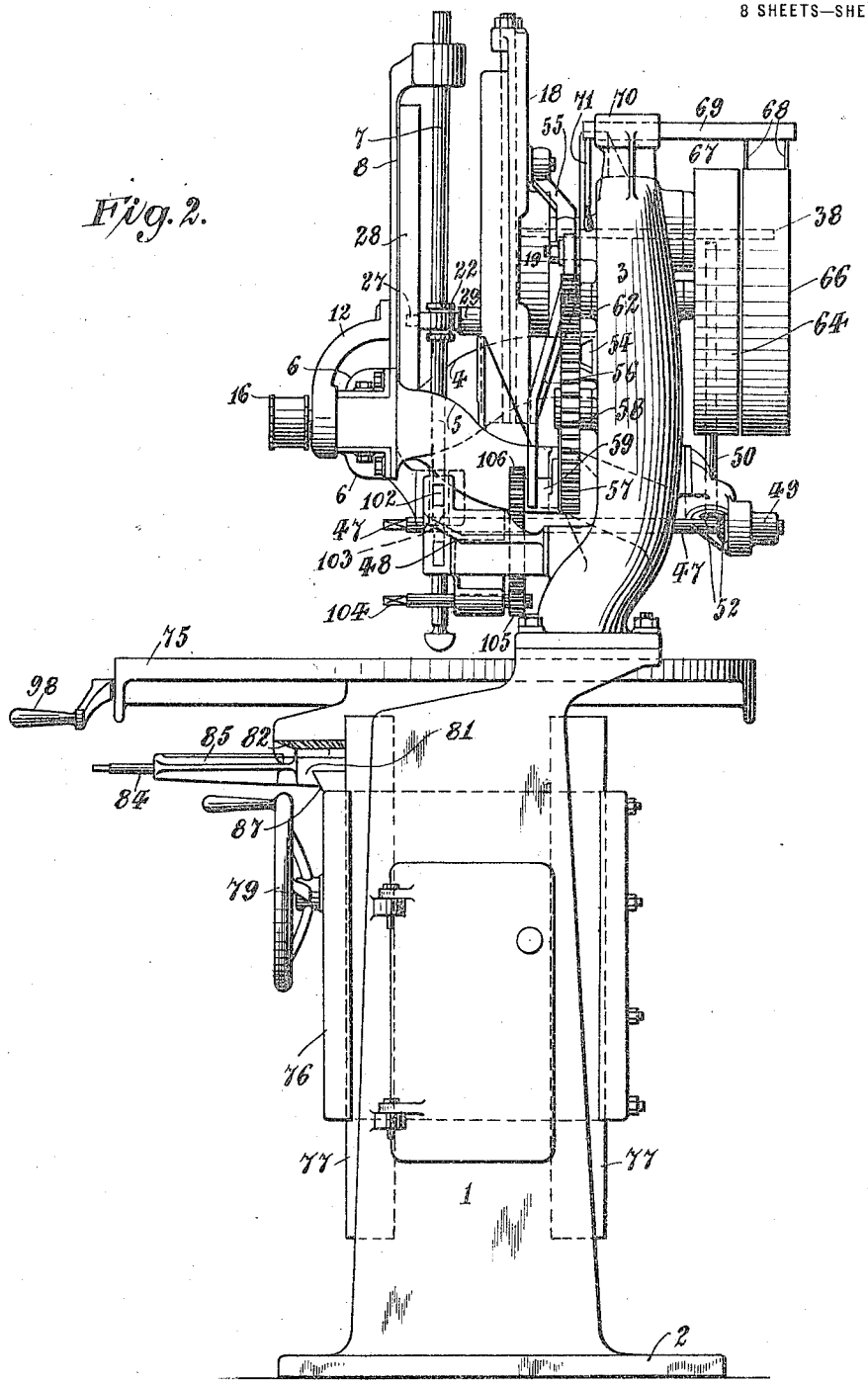

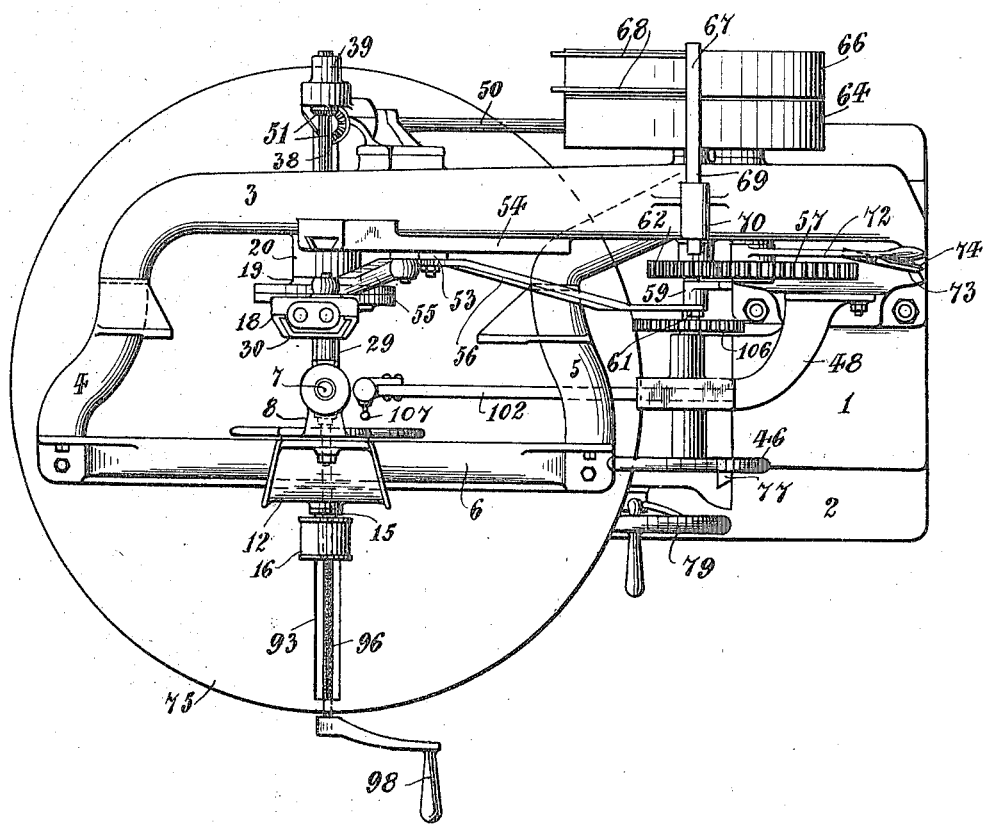

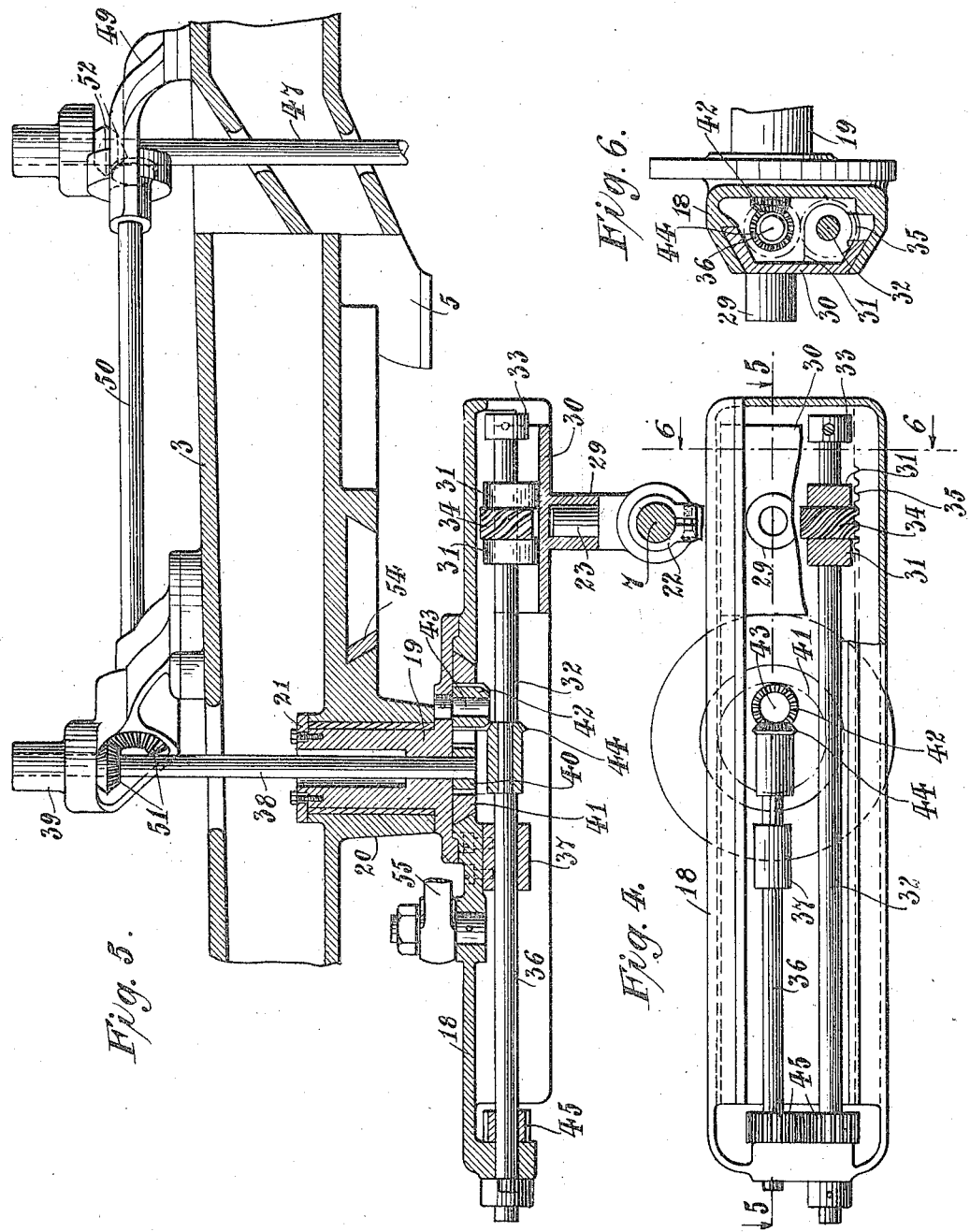

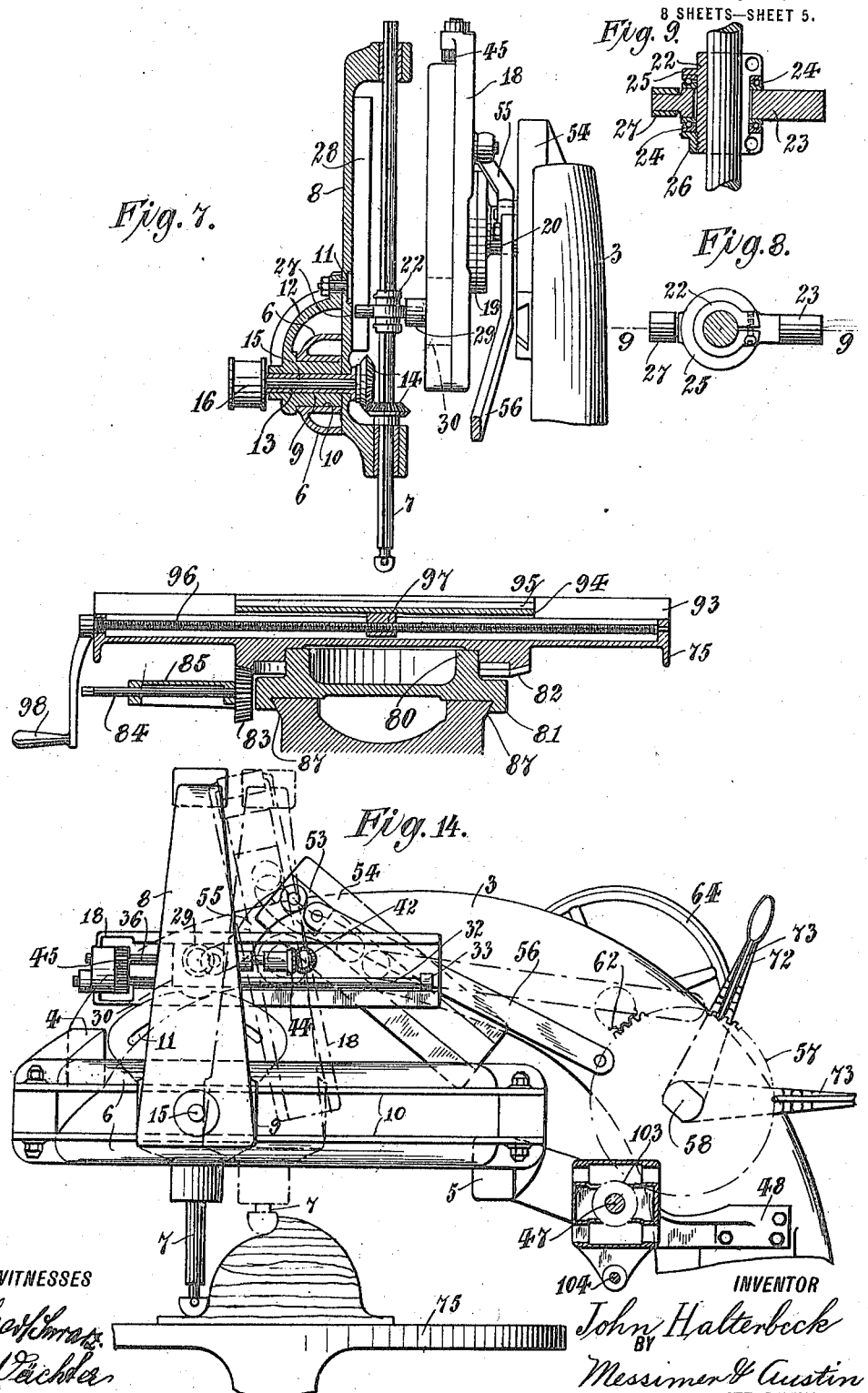

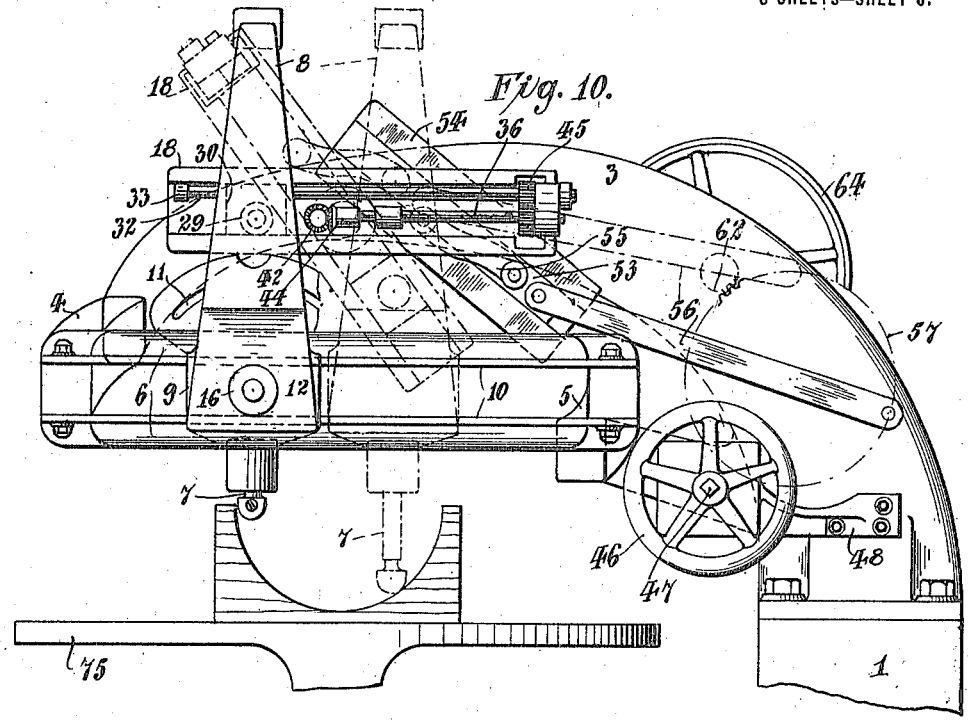
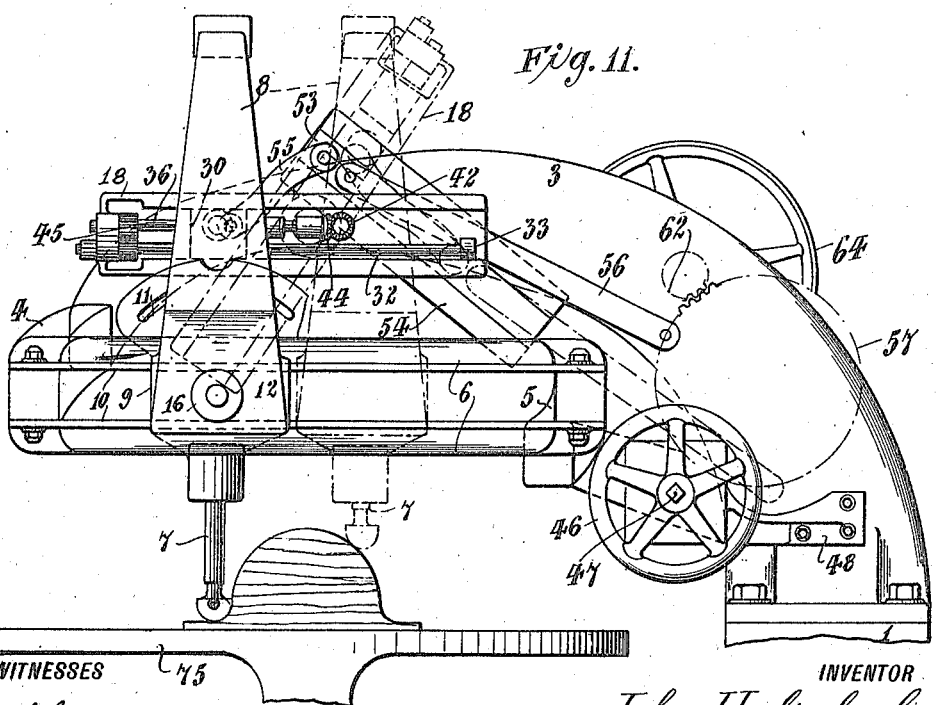

1,234,016.

Patented July 17, 1917.
8 SHEETS—SHEET 8.

WITNESSES
Geo Schwarz
L. Bittiger

INVENTOR
John Halterbeck
BY
Messimer & Austin
ATTORNEYS

UNITED STATES PATENT OFFICE.

JOHN HALTERBECK, OF NEW YORK, N. Y., ASSIGNOR TO GOTTFRIED PIEL, OF NEW YORK, N. Y.

WOODWORKING-MACHINE.

1,234,016.      Specification of Letters Patent.      Patented July 17, 1917.

Application filed August 22, 1912, Serial No. 716,410. Renewed December 15, 1916. Serial No. 137,268.

*To all whom it may concern:*

Be it known that I, JOHN HALTERBECK, a subject of the Emperor of Germany, residing in the borough of Bronx, city, county, and State of New York, have invented certain new and useful Improvements in Woodworking-Machines, of which the following is a specification.

The invention relates to machines for cutting, milling or otherwise working wood or other material, and relates especially to a machine adapted to produce configurations upon the work subjected to it, which are rectilinear or circular in direction, and circular or partly circular and partly rectilinear in cross-section, and to configurations that are also of a varying cross-sectional radii. The machine may be employed for producing different combinations of these configurations, and may also be used as a drilling machine, and for other results that will be apparent to those skilled in the art.

The particular objects of the invention will be more fully set forth in the following description of one form of machine embodying my invention which consists in the new and novel features of construction and combinations of parts hereinafter set forth and claimed.

Referring to the drawings forming a part of this specification—

Figure 1 is a front elevational view of the machine with certain parts removed and others shown in outline only, the tool being in process of cutting a concave groove.

Fig. 2 is a view of the machine looking from the right of Fig. 1.

Fig. 3 is a plan view.

Fig. 4 is a front elevation of the oscillating tool operating member and attending mechanism, when in horizontal position, partly broken away and partly shown in section.

Fig. 5 is a sectional view on the line 5—5 of Fig. 4 viewed arrowwise, showing part of the frame of the machine and other working parts.

Fig. 6 is a sectional view on the line 6—6 of Fig. 4 viewed arrowwise.

Fig. 7 is an elevational, partly sectional view of the tool, the support therefor, the tool actuating mechanism, and the table with the revolving mechanism therefor, and the mechanism for moving the work diametrically thereon, certain parts being shown fragmentally.

Fig. 8 is an enlarged plan view of the connection for operating the tool, the tool stem being shown in section.

Fig. 9 is a sectional view taken on the line 9—9 of Fig. 8.

Fig. 10 is a front elevation of the upper part of the machine showing two positions of the tool when describing concave configurations.

Fig. 11 is a view similar to Fig. 10 showing two positions of the tool when describing convex configurations.

Fig. 12 is a plan view partly broken away and partly sectional showing the machine when in process of cutting a circular groove continuously changing in cross-section.

Fig. 13 is a fragmental partly sectional front elevation of the machine when operating as shown in Fig. 12.

Fig. 14 is a front elevation of the upper part of the machine showing two different steps in the cutting of convex configurations.

Figure 15:
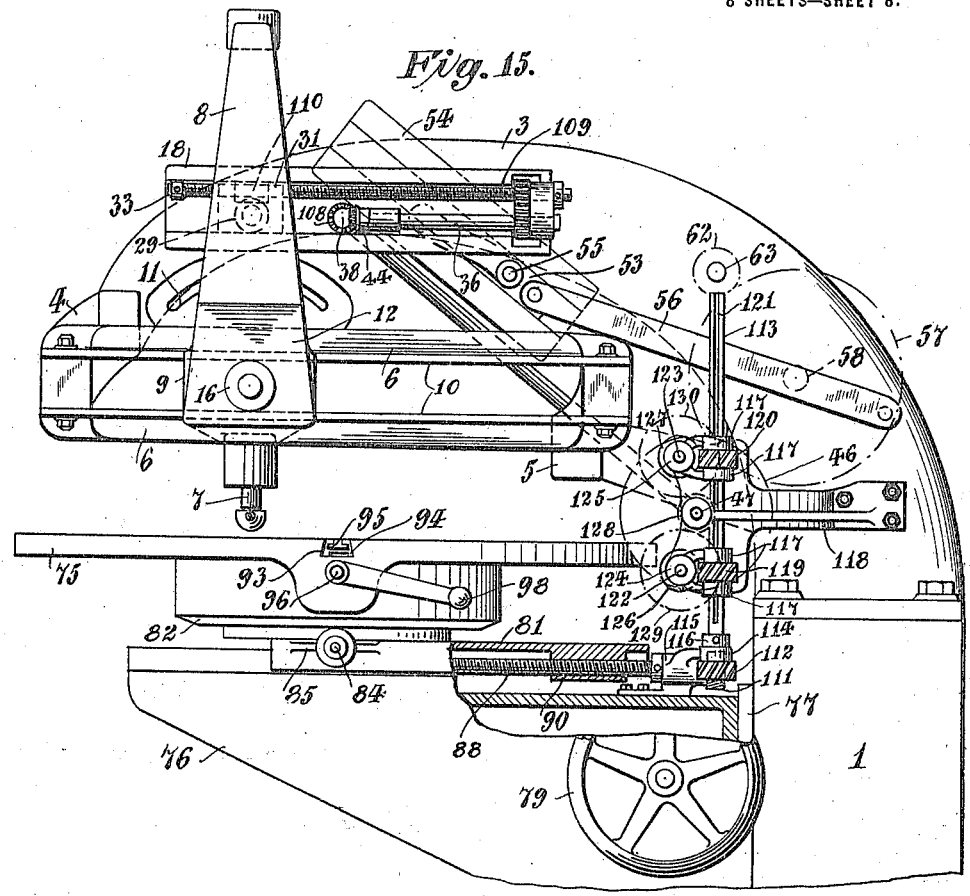
Fig. 15 is a front elevation of the upper part of the machine showing a modified form of construction for varying the travel of the cutter and modified mechanism especially adapted for cutting spiral configurations.

The operating parts of the machine are supported on a stand 1 having a base 2 extended therefrom in suitable manner to support the overhanging arm 3 conveniently bolted to the stand. Arms 4 and 5 extend forwardly from the main arm 3 for supporting the horizontally disposed guide 6. The tool stem 7 is rotatably mounted in its supporting frame 8, positioned to the rear of the guide 6. The frame 8 is secured to a sliding block 9 engaged in a horizontal slot 10 formed in the guide 6, whereby it may move with the block in a horizontal path along the guide. It is provided with the circular slot 11 for securing it in adjustable position to the bracket 12 formed on the block, thus making it feasible to set the tool in a vertical or angular position as may be desired within certain limits. A bushing 13 is passed through the block and frame serving as an axis for rotating the frame when adjustment is desired.

The tool is revolved by means of the bevel-gears 14—14 secured respectively to the stem of the tool and to a shaft 15 passed through the bushing 13, the former gear being keyed in a longitudinal groove formed in the stem to permit the stem to be moved longitudinally independently of the gear. The shaft 15 is driven by a pulley 16 and belt 17 from any suitable source not shown.

The movement of the tool supporting frame along its guideway and the longitudinal movement of the tool is accomplished by means of the oscillatory frame 18. A flanged hub 19 is secured to the frame for rotatably mounting it in a sleeve 20 formed in the frame of the machine, and a plate 21 is secured to the rear of the hub to confine it within the sleeve.

The frame 18 is secured to the tool stem by a swivel connection, thereby permitting the swinging movement given the frame to impart a horizontal and vertical movement to the tool. This causes the cutting edge to describe an arc depending in length upon the degree of swing of the oscillating frame, and depending in radius upon the distance that the swivel connection is removed from the center of oscillation of the frame. These two features are made adjustable as will later be described.

The mechanism for connecting the oscillating frame and tool stem is shown in Figs. 4–9 both inclusive. The tool stem is provided with a split sleeve 22 having lugs at the split portion provided with a screw for securing it upon the stem to permit of adjustment.

A pin 23 is provided with a centrally disposed perforated hub for mounting it upon the sleeve 22. The hub is mounted preferably between ball bearings 24 disposed on the sleeve between a flange 25 extending from one end of the sleeve and a flanged split nut 26 screwed on the other end of the sleeve and having lugs at the split part to accommodate a screw for locking the nut when in proper position. The forward end of the pin is preferably provided with an antifriction roller 27 which is disposed within a groove formed by a pair of guides 28 extending from the tool frame 8. This mechanism permits the tool stem to freely revolve while the pin remains fixed. The other end of the pin sets within a socket formed in a hub 29 extending from a plate 30 secured within the oscillating frame 18.

The plate is provided with drilled lugs 31 for slidably mounting it upon a shaft 32, journaled in the frame 18 and provided with stop collars 33. The plate has beveled sides for slidably securing it with the correspondingly formed sides of the frame 18 as shown in Fig. 6, thereby confining the plate within the frame and permitting of the desired sliding movement.

A worm wheel 34 is keyed to rotate with and slide upon the shaft 32 between the lugs 31, and is in mesh with a rack 35 secured to or formed integral with the frame 18. By this construction the rotation of the shaft 32 will move the swivel connection between the oscillating frame 18 and tool stem 7 to the desired distance from the hub 19. This permits adjustment of the radius of the arc described by the swivel connection and ultimately the radius of the arc described by the cutting tool. It is obvious that if the swivel connection is below the center of oscillation of the frame, that is to say the hub 19, the tool will describe a concave arc, and if it be adjusted to bring it above the center of the tool will describe a convex arc. Also if the shaft 32 is rotated while the machine is operating, the radius of the arc described by the tool may be continuously increased or decreased and the curve described may also pass from a concave to a convex arc, or vice versa, or the adjustment may be set to cut a continuous arc of constant radius.

The shaft 32 is driven by means of a countershaft 36 journaled at one end in the oscillating frame 18 and at the other end in a block 37 secured to the frame, the two shafts being geared together by the gear wheels 45. The shaft 36 is driven by a shaft 38 journaled at one end in the hub 19 and at the other in a bracket 39 secured to the frame of the machine. The shaft extends within the frame 18 and has a pinion 40 secured thereon which engages with an internal gear 41 disposed in an opening of the frame. The gear 41 is secured in rotatable position within the opening and against the hub 19. preferably by beveling its face and the engaging face about the opening as shown in Fig. 5. Another pinion 42, loosely mounted on a pin 43, is also in mesh with the internal gear. The pinion 42 is formed with bevel-gear teeth on one end to engage the bevel-gear 44 secured on the countershaft 36.

The shaft 38 is operated by means of a hand wheel 46 mounted on a shaft 47 journaled in brackets 48 and 49, the shafts 47 and 38 are connected by means of a shaft 50 journaled in the brackets 39 and 49, and the bevel-gears 51—51 mounted respectively on the shafts 38 and 50, and the bevel-gears 52—52 mounted respectively on shafts 50 and 47. By this construction the turning of handle 46 in one direction or the other shifts the swivel connection between the tool and oscillating frame 18 to the desired position. This may be done either while the machine is at a standstill or while it is in operation.

The frame 18 is oscillated by means of a reciprocating block 53 slidably engaged in the guide plate 54, and the link 55 which connects the block with the frame. The block is reciprocated by means of a connecting rod 56 pinned at one end to the block and at its other end to a gear 57 mounted on a shaft 58 secured in the frame of the machine. The connecting rod is made adjustable on the gear by means of a plate 59 to which it is pivotally connected instead of to the gear direct. The gear is formed with corrugated or toothed faces 60 for engaging the corresponding corrugations on the plate, and a bolt 61 is provided for locking the plate to the gear when adjusted. The maximum oscillation of the frame 18 is from one horizontal position to the other, that is to say, it includes a swing of 180 degrees and the tool accordingly cuts no greater arc than this. The adjustment of the connecting rod however, makes it possible to swing the frame 18 through arcs less than 180 degrees, thereby causing the tool to describe correspondingly smaller arcs. This mechanism is constructed and suitably positioned to prevent a dead centering of the parts while the frame is being oscillated.

The gear 57 is continuously rotated by a pinion 62 mounted on a shaft 63 journaled in the frame of the machine. The shaft 63 is driven by a pulley 64 mounted thereon and connected to any source of power not shown. An idler 66 is mounted on the shaft 63 and a belt shifting device 67 is provided for shifting the belt when desired. The belt shifter may be of any usual construction and is here shown as comprising a belt engaging fork 68 secured on a reciprocating rod slidably mounted in the sleeve 70 extending from the frame of the machine, and having an operating handle 71 on its forward end in easy reach by the operator at the front of the machine.

The belt may be shifted to the idler and the tool operated only as a drill, or the shifting may be for the purpose of reciprocating the gear 57 instead of completely revolving it. To accomplish the latter a hand lever 72 is loosely mounted on the shaft with the gear 57 and is normally out of engagement therewith. A latch lever 73 is pivotally connected to the hand lever, and has its upper end suitably positioned to be moved toward the hand lever and held there by the hand operating the lever. This throws the lower or latch end into a space between two teeth of the gear thereby locking the arm with the gear so that as the arm is swung to and fro, the gear will be carried with it. A spring 74 is provided for normally holding the latch out of engagement with the gear.

The work is supported upon a table 75 and independent means are provided for moving the table in a vertical direction to and from the tool, for rotating the table in a horizontal plane, for reciprocating it in a restricted path in a horizontal plane, and for reciprocating the work secured upon the table in a radial direction.

The table is supported upon a bracket 76 slidably mounted in guide-ways 77 secured upon the stand 1 and is carried to and from the tool and held in adjustable position by means of screw mechanism 78 of usual construction operated by hand wheel 79.

The table is chambered to fit upon the hub 80 formed on a carriage 81 whereby the table may be freely rotated. A bevel-gear 82 is formed on the table concentric with the hub and is in mesh with a driving bevel-gear 83 mounted on a shaft 84 secured in a bracket 85 which projects from the carriage 81. The shaft 84 is squared at the end to receive a hand crank 98 thereby affording means for rotating the table when desired. The carriage is slidably mounted upon the bracket 76 by means of the miter joint 87.

The carriage is moved along the bracket 76 by means of a screw 88, mounted in lugs 89 formed on the bracket, and an engaging nut 90 formed on the carriage. The screw is provided with a hand wheel 91 for rotating it. This moves the carriage as desired and a collar 92 is provided for retaining the screw in proper position. The table is provided with a groove 93 extending diametrically across it, which is formed with beveled sides to engage a similarly bevel sided bar 94 having a groove 95 formed longitudinally through it for securing suitable means, (not shown) for holding the work in place upon the table. The bar 94 is moved longitudinally within its groove by means of a threaded shaft 96 journaled in the table and an engaging nut 97 secured to the bar. The shaft is squared at the end for receiving the hand crank 98. By turning the crank the bar may be moved in either direction as desired thereby shifting the work in a diametrical direction upon the table.

Other means than the hand wheel 46 are provided whereby the adjustment of the radius of the arc described by the cutting tool, may be made automatically in a predetermined manner while the machine is being operated. This mechanism is shown in Figs. 12 and 13 wherein a piece of work A is shown in process of having a circular groove cut upon it of varying cross-sectional radii. Here a guide or templet 99 is secured on the work to engage a roller 100 mounted on a post 101 secured in the end of a rack bar 102. The opposite end of the rack bar passes through the bracket 48 and is in mesh with a gear 103 mounted on the shaft 47 within a chamber of the bracket. The gear 103 and hand wheel 46 may be withdrawn from the shaft 47 and placed upon a shaft 104 (see Fig. 2) which is geared to the shaft 47 by means of a smaller gear 105 and a larger gear 106 mounted respectively on the shafts 104 and 47, thereby providing a different speed than when the parts are operated directly from the shaft 47. The rack bar 102 is adjustably mounted on the post 101 by means of the thumb screw 107 to adapt the mechanism for different heights of work and to shift the rack bar to a suitable position when its engaging gear is removed to the shaft below.

Figure 16:
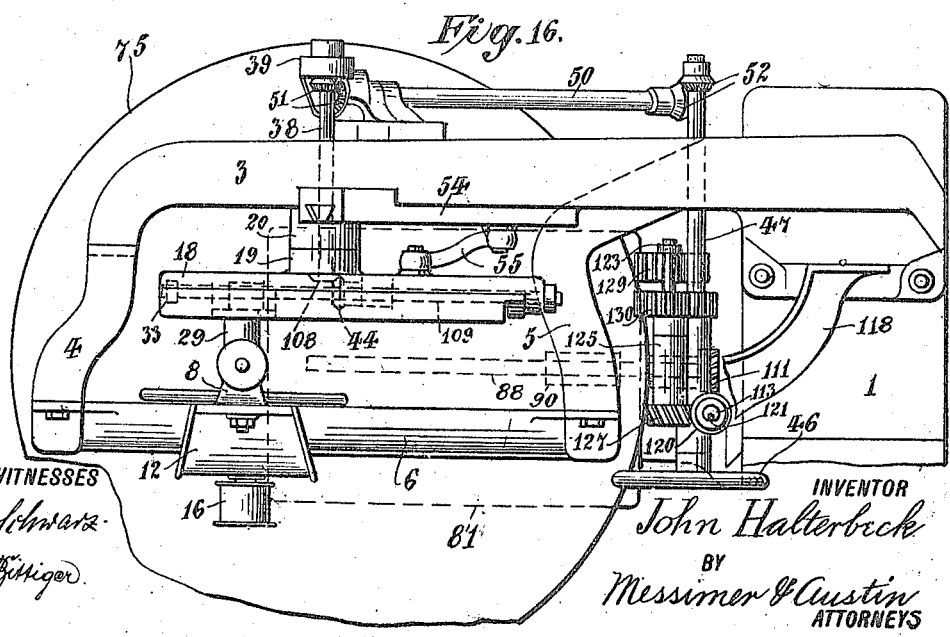
Fig. 16 is a broken plan view of the modified form shown in Fig. 15.

Figs. 15 and 16 are modified constructions for adjusting the distance between the hub 19 and the hub 29, and for operably connecting this mechanism with the mechanism which moves the carriage 81. This latter modification permits the adjustment of the travel of the cutting tool and table at the same operation. By this construction spiral configurations may be formed on the work as well as other styles of configurations that will become apparent to those skilled in the art.

The shaft 38 has a beveled gear 108 secured on the end within the frame 18. This gear is in mesh with the gear 44 secured to the end of the shaft 36. A threaded shaft 109 is mounted in the frame 18 at one of its ends and in the lug 33 formed on the frame at its other end. A nut 110 is screwed on the shaft 109 between the lugs 31. This construction permits the adjustment of the swivel connection for the cutting tool to and from the oscillating hub 19 but obviates the necessity of the gears 40, 41, 42, 34 and the rack 35 as shown in Figs. 4 and 5.

A spiral gear 111 is mounted on the end of the screw 88 and is in mesh with a spiral gear 112 mounted on the end of a shaft 113. This shaft is mounted at its lower end in a bearing 114 formed on the bracket 115 which is secured to the bracket 76. The journal is positioned between the gear 112 and a collar 116 secured on the shaft 113 thereby securing the shaft against longitudinal movement. Other bearings 117 are provided for the upper part of shaft 113. These are arranged in pairs on a bracket 118 secured to the arm 3. Spiral gears 119 and 120 are mounted on the shaft 113 between the respective pairs of bearings 117 and are keyed in a slot 121 formed in the shaft. This provides a continuous drive for the gears and permits the shaft to move longitudinally as the bracket 76 is moved up and down by the turning of hand wheel 79. Shafts 122 and 123 are mounted respectively in the bearings 124 and 125 formed on the bracket 118. They have the respective spiral gears 126 and 127 secured upon them. These are in mesh with their respective gears 119 and 120. The shaft 47 has a pinion 128 upon it and gears 129 and 130 are slidably secured upon the respective shafts 122 and 123 so that either may be moved upon its shaft to bring it into or out of engagement with the pinion 128 as desired.

The operation of the machine is as follows:—

Before cutting the desired configuration in any instance, the end of the connecting rod 56 is secured in suitably adjusted position upon the gear 57 by means of the bolt 61 as already described to cause the required angle to be described by the cutting tool, the maximum arc being a semi-circle as shown in the drawings.

When it is desired to cut a concave groove or trough through wood or other material as shown in Figs. 1 and 10, the swivel joint connection between the oscillating frame 18 and the tool is adjusted to a position relative the center of oscillation of the frame to permit the cutting tool to describe an arc of the required radius. This is accomplished by turning the hand wheel 46 the desired amount. This turns the shaft 32 by means of the intervening shafts 47, 50, 38 and 36, respectively operably connected by means of the gears 52, 51, 40, 41, 42, 44 and 45. The turning of the shaft 32 revolves the worm gear 34 which is in mesh with the stationary rack 35. This causes the worm to move along its shaft, thereby carrying the swivel joint connection operating the cutter, with it to the desired position relative the hub 19 which is the center of oscillation.

The table 75 is adjusted by the hand wheel 79 to cause a very small cut to be made in the wood when the machine is first operated. The belt 65 is shifted to the driving pulley and the machine set in operation, unless the machine is to be operated by hand, in which case the belt is left upon the idler and the hand wheel 72 is latched upon the gear 57 and operated by hand to swing the gear to and fro. As the machine is operating the work is slowly moved longitudinally beneath the tool by means of the hand crank 98, the work being properly secured on the table in the direction of this movement. After the entire length of the groove has been cut in the wood the table is then slightly raised by the hand wheel 79 and a deeper cut taken. This operation is continued until the groove is finally completed. Instead of cutting the entire length of the groove by the first operation, the work may be fed by steps up to the cutter by turning the wheel 79, until a cut is made the entire depth of the groove and then a similar cut may be made adjacent the first and so on until the groove is finished.

When it is desired that the tool should travel in a convex path, as shown in Figs. 11 and 14, which illustrate the cutting of a half round on a piece of work, the operation is the same as that already described except that the swivel joint connecting the tool with the oscillating frame 18 is shifted to the opposite side of the center of oscillation. In either of these instances when a straight section is desired to be cut, as for instance a groove with a partially flat base, the operation is similar to that already described, with the exception that the hand wheel 91 is turned a suitable amount thereby turning the screw 88 which moves the carriage 81. This moves the work along at right-angles to the direction of the groove cut. The cut is thus widened, but the adjustment should be made gradually to produce a smooth base for the groove.

When a circular groove of circular cross-section is desired to be formed in a piece of work, the parts are adjusted and operated as before, except that the shaft 96 and hand wheel 91 are not operated, but instead the shaft 84 is turned to revolve the table, whereby a circular instead of a straight groove is cut, the table first being shifted, by turning the hand wheel 91, to the desired position to give the desired diameter to the groove cut.

When it is desired that the cross-section of the cut be made of varying radius, as shown in Figs. 12 and 13 the guide or templet 99 is secured upon the work in suitable position relative the center of the table, depending upon the degree of change in the radius desired. The roller 100 is then placed between the sections of the templet and the machine operated as before. The templet may vary in form and size to suit the particular work for which it is intended. The same results may be obtained without the use of the templet and accompanying mechanism by simply turning the hand wheel 46 the proper amounts to produce the required differences in radii of the consecutive cuts. In either instance the worm wheel 34 is thereby moved while the machine is operating, through the intervention of the same mechanism as already described.

In Figs. 15 and 16 the carriage 81 upon which the table 75 is rotatably mounted is moved by the turning of hand wheel 46. This hand wheel also moves the swivel joint connecting the cutting tool with the frame 18, the latter operation being similar to that already described. When the hand wheel is turned the carriage 81 is moved in either direction depending upon which of the two gear wheels 129 and 130 are moved into engagement with the pinion 128. This construction permits the table 75 to be moved either way in the direction of the reciprocating tool while it is gradually changing the radius of its swivel connection. The relative sizes of the several gears operating these parts are proportioned so that the table will be moved a suitable distance to compensate for the change in the arc described by the cutting tool on one side of the configuration being formed. By this mechanism, spiral patterns may be made which will be right or left handed depending upon the direction in which the hand wheel 46 and shaft 84 are turned. The machine provides a cutting tool and suitable operating means, whereby holes may be drilled at various angles; grooves or troughs cut having rectangular sides with rounding corners of various sizes, or of circular cross-sections of predetermined angles and radii; whereby circular grooves or troughs may be cut of predetermined uniform circular cross-sections, or of cross-sections of varying radii; and whereby right and left handed spiral grooves may be cut. The machine also provides for the cutting of convex configurations as well as the configuration above described. Other results may be produced which will be apparent to those skilled in the art. It is obvious that various changes within the skill of the mechanic may be made in the constructions shown without departing from the spirit of the invention, provided the means set forth in the following claims are employed.

Having thus described my invention, I claim:—

1. In a wood working machine, the combination with a vertically movable tool stem, of a guiding frame pivoted intermediate its length for movement in a vertical plane, means carried by the frame for supporting said tool stem in adjusted position, mechanism for varying the position of said means relative to the pivotal connection of said frame, means for rocking said frame and driving means having a geared connection with said stem for continuously driving the same in its several adjusted positions.

2. In a wood working machine, the combination with a support and a guiding frame pivoted to said support, of a tool stem slidably mounted on said frame for horizontal movement, means mounted in the support and frame and passing through the pivotal connection of the guiding frame and support for changing the position of said tool stem, means for changing the position of said frame relative to said support and means for driving said tool stem in all adjusted positions of said stem.

3. In a wood working machine, the combination with a support, having a frame pivoted thereto for swinging movement in a vertical plane, of a tool spindle slidably mounted in said frame, and means for rocking said frame, means passing through the center of oscillation of said frame for moving said spindle toward and past said center of oscillation.

4. In a wood working machine, having a horizontally disposed guide, a tool stem, a supporting frame therefor mounted for oscillatory movement, a sliding block secured to said frame and mounted in said guide, a driving connection for feeding the block along the guide, said connection including a shaft passing through said block and frame and forming an axis of oscillation for said frame.

5. In a wood working machine, a block having a horizontal travel, a plate movable in a plane parallel to the plane of travel of the block and at an angle to the horizontal, a swivel connection driven by said plate and guided by said block, a tool stem carried by said connection and means for locking said tool stem in adjusted position in said swivel.

6. In a wood working machine the combination of a horizontally movable support, a swivel carried thereby, means for moving said swivel in an arc, a tool stem adjustable axially in said swivel, means coupled with said first mentioned means for moving said swivel relative to the center of the arc simultaneously with its movement along the arc, means for varying the ratio of said movements, and means geared to said stem for rotating the same.

7. In a wood working machine, the combination with a horizontally disposed guideway, of a block slidably mounted in said guideway, a tool stem frame adjustably mounted on said block, swivel guides carried by said frame, a tool stem journaled in said frame, a swivel operably connected to said stem to slide the same axially and means for moving the swivel along said guides.

8. In a wood working machine, the combination with a vertically adjustable support for the work, of means for moving said support horizontally, an adjustable tool stem, means coupled with said support moving means for simultaneously swinging said adjustable tool stem over a pre-set arc, means for driving said tool stem during the movement of said stem and support.

9. In a wood working machine, the combination with a support for the work and means for moving said support in two directions at right angles to each other, of a tool stem, means for setting said stem in adjusted angular position relative to said support, means for moving said stem bodily relative to said support while so adjusted and means for rotating said stem during its bodily movement.

10. In a wood working machine, the combination with a support for the work having a linear movement in a horizontal plane, of a tool stem, means for setting said stem in adjusted angular position relative to said support, means for moving said stem bodily relative to said support while so adjusted, means for rotating said stem during its bodily movement, and means coupled with said stem moving means for moving said work support.

11. In a wood working machine, the combination with a tool stem guided for longitudinal movement, of means for moving said stem longitudinally, said means comprising an oscillatory frame, a guide plate, a block slidably mounted in said plate, a rotating gear, a link connection between said gear and block, means for connecting said link in adjustable position relative to the axis of said gear, and a link connection between said block and oscillatory frame.

12. In a wood working machine, a table for supporting the work, a cutting tool, a swinging member, means for connecting the swinging member and tool for moving the tool by the swinging member in a plurality of directions, means for shifting the tool relative the axis of the swinging member, means for moving the table parallel to the shifting of the tool, means for operably connecting the shifting means and table moving means for moving them in opposite directions, and means for moving the work along the table.

13. In a wood working machine, a table for supporting the work, a cutting tool, a swinging member, means for connecting the swinging member and tool for moving the tool by the swinging member in a plurality of directions, means for shifting the tool relative the axis of the swinging member, means for moving the table parallel to the shifting of the tool, means for operably connecting the shifting means and table moving means for moving them in opposite directions, and means for revolving the table.

14. In a wood working machine, a table for supporting the work, a cutting tool, a swinging member, means for connecting the swinging member and tool for moving the tool by the swinging member in a plurality of directions, means for shifting the tool relative the axis of the swinging member, means for moving the table parallel to the shifting of the tool, means for operably connecting the shifting means and table moving means for moving them in opposite directions, means for revolving the table, and means for independently moving the work along the table.

This specification, signed and witnessed this 21st day of Aug., A. D., 1912.

JOHN HALTERBECK.

Witnesses:
S. C. YEATON,
F. E. MANUEL.

Copies of this patent may be obtained for five cents each, by addressing the "Commissioner of Patents, Washington, D. C."